(12) United States Patent
Kaneko

(10) Patent No.: US 11,029,255 B2
(45) Date of Patent: Jun. 8, 2021

(54) DEFECT INSPECTION DEVICE, DEFECT INSPECTION METHOD, AND PROGRAM

(71) Applicant: FUJIFILM Corporation, Tokyo (JP)

(72) Inventor: Yasuhiko Kaneko, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 226 days.

(21) Appl. No.: 16/268,673

(22) Filed: Feb. 6, 2019

(65) Prior Publication Data

US 2019/0170659 A1 Jun. 6, 2019

Related U.S. Application Data

(63) Continuation of application No. PCT/JP2017/022741, filed on Jun. 20, 2017.

(30) Foreign Application Priority Data

Aug. 18, 2016 (JP) .............................. JP2016-160770

(51) Int. Cl.
*G01N 21/88* (2006.01)
*G01N 23/18* (2018.01)
*G01N 23/04* (2018.01)

(52) U.S. Cl.
CPC ......... *G01N 21/8851* (2013.01); *G01N 21/88* (2013.01); *G01N 23/04* (2013.01); *G01N 23/18* (2013.01); *G01N 2021/8854* (2013.01)

(58) Field of Classification Search
CPC .... G01N 21/8851; G01N 21/88; G01N 23/04; G01N 23/18; G01N 2021/8854
See application file for complete search history.

(56) References Cited

U.S. PATENT DOCUMENTS 6,973,209 B2 12/2005 Tanaka
8,824,773 B2 9/2014 Minekawa et al.
(Continued)

FOREIGN PATENT DOCUMENTS

JP 01-088237 A 4/1989
JP 2009-139230 A 6/2009
(Continued)

OTHER PUBLICATIONS

International Preliminary Report on Patentability of PCT/JP2017/022741 dated Feb. 18, 2019.
(Continued)

*Primary Examiner* — Siamak Harandi
(74) *Attorney, Agent, or Firm* — Sughrue Mion, PLLC

(57) ABSTRACT

An object of the present invention is to provide a defect inspection device, a defect inspection method, and a program that support an image interpreter so that image interpretation can be performed accurately and rapidly. A defect inspection device (10) includes an image acquisition unit, an image processing unit, a storage unit (24), a defect candidate classification unit that assigns a defect classification to an extracted defect candidate image on the basis of classification information stored in the storage unit (24), a display unit (18) that displays the received light image, a manipulation unit (14) that receives selection of a display or a non-display of an auxiliary indication indicating a position of the defect candidate image and the classification of the defect candidate image on the display unit (18), and outputs a command for the selected display or non-display of the auxiliary indication, and a display control unit that performs a display or a non-display of the auxiliary indication on the display unit (18) on the basis of the command output from the manipulation unit (14).

11 Claims, 13 Drawing Sheets

(56) References Cited

U.S. PATENT DOCUMENTS

| | | | | |
|---|---|---|---|---|
| 2002/0009220 A1* | 1/2002 | Tanaka | ................... | G01N 21/94 |
| | | | | 382/145 |
| 2015/0029324 A1* | 1/2015 | Tanabe | ............. | G01N 21/95692 |
| | | | | 348/79 |
| 2015/0109318 A1 | 4/2015 | Ito et al. | | |
| 2018/0299389 A1* | 10/2018 | Kan Eko | .......... | G05B 19/41875 |
| 2019/0035066 A1* | 1/2019 | Bae | ................... | G01N 21/8851 |

FOREIGN PATENT DOCUMENTS

| | | |
|---|---|---|
| JP | 2010-054365 A | 3/2010 |
| JP | 2011-085501 A | 4/2011 |
| JP | 2011-145275 A | 7/2011 |
| JP | 2015-078964 A | 4/2015 |
| JP | 2015-137919 A | 7/2015 |
| JP | 2016-114415 A | 6/2016 |
| WO | 01/41068 A1 | 6/2001 |

OTHER PUBLICATIONS

International Search Report for PCT/JP2017/022741 dated Sep. 12, 2017 (PCT/ISA/210).
Written Opinion of PCT/JP2017/022741 dated Sep. 12, 2017.
Communication dated Feb. 17, 2020, from the Japanese Patent Office in Application No. 2018-534286.

* cited by examiner

PRODUCT DATA

- PRODUCT SPECIFYING INFORMATION
- PRODUCT ATTRIBUTE INFORMATION
- INSPECTION AREA DESIGNATION INFORMATION

INSPECTION OBJECT INSPECTION RESULT DATA

- INSPECTION OBJECT SPECIFYING INFORMATION
- INSPECTION OBJECT MEASUREMENT DATA
- INFORMATION ON DEFECT CANDIDATE
- DIAGNOSIS RESULT DATA

DEFECT INSPECTION DEVICE, DEFECT INSPECTION METHOD, AND PROGRAM

CROSS-REFERENCE TO RELATED APPLICATIONS

The present application is a Continuation of PCT International Application No. PCT/JP2017/022741 filed on Jun. 20, 2017 claiming priority under 35 U.S.C § 119(a) to Japanese Patent Application No. 2016-160770 filed on Aug. 18, 2016. Each of the above applications is hereby expressly incorporated by reference, in their entirety, into the present application.

BACKGROUND OF THE INVENTION

1. Field of the Invention

The present invention relates to a defect inspection device, a defect inspection method, and a program, and more particularly, to a defect inspection device, a defect inspection method, and a program for supporting inspection of defects using images of industrial products that are inspection targets.

2. Description of the Related Art

JP2010-054365A relates to an inspection device that inspects a defect of a solar cell. JP2010-054365A discloses generating a crack identification image, a dark area identification image, and a disconnection identification image corresponding to defects of a cracked portion, a dark area portion, and a disconnection portion in a cell image using different colors, and displaying the images to be superimposed on the cracked portion, the dark area portion, and the disconnection portion (FIG. 6 of JP2010-054365A).

SUMMARY OF THE INVENTION

Here, as a method of inspecting a defect using an image (received light image) obtained by imaging an inspection object, there is a scheme called image interpretation in which an inspector (an image interpreter) visually observes a received light image, discovers the defect, and classifies the defect. In this case, the image interpreter discovers the defect in the received light image on the basis of his or her experience and knowledge, and discriminates a type of defect.

However, not all image interpreters have rich experiences and high level of knowledge, but some image interpreters may incorrectly discover a defect and discriminate a type of defect, and it may take time to interpret the image. Therefore, in a case where an auxiliary indication is performed to clearly indicate a place that is a candidate for a defect by applying a technique such as image processing to a received light image in advance, the image interpreter may pay attention to an indicated defect candidate image and can perform more efficient image interpretation.

Further, in a case where a type of defect estimated by applying the technique such as image processing to the received light image in advance is indicated in an auxiliary manner, the image interpreter may discriminate the type of defect with reference to the indicated type and can perform more efficient image interpretation.

On the other hand, in a case where many auxiliary indications indicating defect candidate images are shown in the received light image, or in a case where the auxiliary indication is displayed to be superimposed on the defect candidate image, the displayed auxiliary indication may interfere with image interpretation and accurate and rapid image interpretation may be difficult.

JP2010-054365A does not mention a technique for accurately and rapidly perform image interpretation in a received light image.

The present invention has been made in view of such circumstances, and an object of the present invention is to provide a defect inspection device, a defect inspection method, and a program that support an image interpreter so that image interpretation can be performed accurately and rapidly.

In order to achieve the above object, a defect inspection device according to an aspect of the present invention includes an image acquisition unit that acquires a received light image created on the basis of reflected light or transmitted light from an inspection object which is obtained by irradiating the inspection object with light rays or radiation; an image processing unit that extracts a defect candidate image that is an image corresponding to a defect candidate of the inspection object from the received light image through image processing; a storage unit that stores at least one of a defect image corresponding to a defect of the inspection object extracted in the past or information indicating a feature of the defect image, and classification information including a classification result indicating a classification of the defect of the defect image; a defect candidate classification unit that assigns a defect classification to the extracted defect candidate image on the basis of the classification information stored in the storage unit; a display unit that displays the received light image; a manipulation unit that receives selection of a display or a non-display of an auxiliary indication indicating a position of the defect candidate image and the classification of the defect candidate image on the display unit, and outputs a command for the selected display or non-display of the auxiliary indication; and a display control unit that performs a display or a non-display of the auxiliary indication on the display unit on the basis of the command output from the manipulation unit.

According to the aspect, the position of the defect candidate image of the image corresponding to the defect candidate and the classification of the defect are indicated by the auxiliary indication, and the image interpreter can control a display or a non-display of the auxiliary indication. Thus, according to the aspect, it is possible to accurately and rapidly discover the defect candidate image using the auxiliary indication indicating the position of the defect candidate image, to accurately and rapidly determine the classification of the defect on the basis of the auxiliary indication indicating the classification of the defect, and to optionally control the display or the non-display of the auxiliary indication. Therefore, it is possible to support the execution of accurate and rapid image interpretation.

Preferably, the storage unit stores the classification result classified on the basis of a cause of generation of the defect.

According to this aspect, the storage unit stores the classification result classified on the basis of the cause of generation of the defect, and the defect candidate classification unit classifies the defect of the defect candidate image on the basis of the stored cause of generation of the defect. Thus, in the aspect, it is possible to support image interpretation in which the classification of the defect based on the cause of the generation of the defect is performed.

Preferably, the display control unit causes the display unit to display the auxiliary indication including a figure indicating a position of the defect candidate image.

According to this aspect, since the auxiliary indication to be displayed on the display unit by the display control unit includes the figure indicating the position of the defect candidate image, it is possible to cause the image interpreter to more accurately and rapidly recognize the position of the defect candidate image.

Preferably, the display control unit causes the display unit to display the auxiliary indication having the figure surrounding the periphery of the defect candidate image in the received light image.

According to this aspect, since the auxiliary indication to be displayed on the display unit by the display control unit is the figure surrounding the periphery of the defect candidate image, it is possible to cause the image interpreter to more accurately and rapidly recognize the position of the defect candidate image.

Preferably, the display control unit causes the display unit to display the auxiliary indication indicating the assigned classification with at least one of a symbol or a character.

According to this aspect, since the auxiliary indication to be displayed on the display unit by the display control unit indicates the classification with at least one of the symbol and the character, it is possible to cause the image interpreter to more accurately and rapidly recognize the classification of the defect of the defect candidate image.

Preferably, the display control unit causes the display unit to display the auxiliary indication of which color has partially or entirely been changed according to the assigned classification.

According to the aspect, since the color of the auxiliary indication to be displayed on the display unit by the display control unit is partially or entirely changed according to the classification of the defect, it is possible to cause the image interpreter to accurately and rapidly recognize the classification of the defect.

Preferably, the display control unit causes the display unit to display the auxiliary indication including information on a size of the defect candidate based on the extracted defect candidate image.

According to the aspect, since the auxiliary indication to be displayed on the display unit by the display control unit includes information on the size of the defect candidate, it is possible to support accurate and rapid image interpretation for the image interpreter.

Preferably, the defect inspection device further includes an input unit that receives an input of a type of classification stored in the storage unit, and the storage unit stores the classification result on the basis of the type input by the input unit.

According to this aspect, the defect inspection device includes an input unit for enabling a user to input an input of a type of any classification, and the storage unit stores the classification result on the basis of the type input by the input unit. Thus, in the aspect, an indication indicating any classification of the user can be included in the auxiliary indication.

Preferably, the manipulation unit receives selection of a display or a non-display of the auxiliary indication according to an input of a wall thickness of the inspection object, an area of the inspection object, or a size of the defect candidate.

According to this aspect, since the image interpreter can perform the input of the wall thickness of the inspection object, the area of the inspection object, or the size of the defect candidate and perform selection of a display or a non-display of the auxiliary indication, it is possible to display the auxiliary indication required by the image interpreter and to cause the auxiliary indication not required by the image interpreter not to be displayed. Thus, in the aspect, since only the auxiliary indication necessary for image interpretation of the image interpreter is displayed, it is possible to support more accurate and rapid image interpretation.

Preferably, the defect candidate classification unit calculates a degree of similarity between the extracted defect candidate image and at least one of the defect image or information indicating a feature of the defect image stored in the storage unit, and assigns a classification of the extracted defect candidate image on the basis of the classification result of the defect image having the highest calculated degree of similarity.

According to the aspect, the defect candidate classification unit calculates a degree of similarity between the extracted defect candidate image and the defect image and/or the information indicating a feature of the defect image stored in the storage unit, and assigns a classification to the defect candidate image on the basis of the degree of similarity. Accordingly, in the aspect, more reliable auxiliary indication of the defect classification can be performed.

A defect inspection method according to another aspect of the present invention includes an image acquisition step of acquiring a received light image created on the basis of reflected light or transmitted light from an inspection object which is obtained by irradiating the inspection object with light rays or radiation; an image processing step of extracting a defect candidate image that is an image corresponding to a defect candidate of the inspection object from the received light image through image processing; a storage step of storing at least one of a defect image corresponding to a defect of the inspection object extracted in the past or information indicating a feature of the defect image, and classification information including a classification result indicating a classification of the defect of the defect image in a storage unit; a defect candidate classification step of assigning a defect classification to the extracted defect candidate image on the basis of the classification information stored in the storage unit; a display step of displaying the received light image on a display unit; a manipulation step of receiving selection of a display or a non-display of an auxiliary indication indicating a position of the defect candidate image and the classification of the defect candidate image on the display unit, and outputting a command for the selected display or non-display of the auxiliary indication; and a display control step of performing a display or a non-display of the auxiliary indication on the display unit on the basis of the command output from the manipulation step.

A defect inspection program according to another aspect of the present invention causes a computer to realize: an image acquisition step of acquiring a received light image created on the basis of reflected light or transmitted light from an inspection object which is obtained by irradiating the inspection object with light rays or radiation; an image processing step of extracting a defect candidate image that is an image corresponding to a defect candidate of the inspection object from the received light image through image processing; a storage step of storing at least one of a defect image corresponding to a defect of the inspection object extracted in the past or information indicating a feature of the defect image, and classification information including a classification result indicating a classification of the defect of the defect image in a storage unit; a defect candidate classification step of assigning a defect classification to the extracted defect candidate image on the basis of the classification information stored in the storage unit; a display step of displaying the received light image on a display unit; a manipulation step of receiving selection of a display or a non-display of an auxiliary indication indicating a position of the defect candidate image and the classification of the defect candidate image on the display unit, and outputting a command for the selected display or non-display of the auxiliary indication; and a display control step of performing a display or a non-display of the auxiliary indication on the display unit on the basis of the command output from the manipulation step. A computer-readable non-transitory tangible medium on which the defect inspection program is recorded is also included in the aspect of the present invention.

According to the present invention, since the position of the defect candidate image of the image corresponding to the defect candidate and the classification of the defect are indicated by the auxiliary indication, and the image interpreter can control a display or a non-display of the auxiliary indication, it is possible to accurately and rapidly discover the defect candidate image using the auxiliary indication indicating the position of the defect candidate image and to accurately and rapidly determine the classification of the defect through the auxiliary indication indicating the classification of the defect. Further, it is possible to optionally control the display or the non-display of the auxiliary indication. Therefore, it is possible to support the execution of accurate and rapid image interpretation.

BRIEF DESCRIPTION OF THE DRAWINGS

FIG. 4 is a block diagram illustrating an example of product data.

FIG. 5 is a block diagram illustrating an example of inspection object inspection result data.

DESCRIPTION OF THE PREFERRED EMBODIMENTS

Hereinafter, embodiments of a defect inspection device, a defect inspection method, and a program according to the present invention will be described with reference to the accompanying drawings.

[Configuration of Defect Inspection Device]

Figure 1:
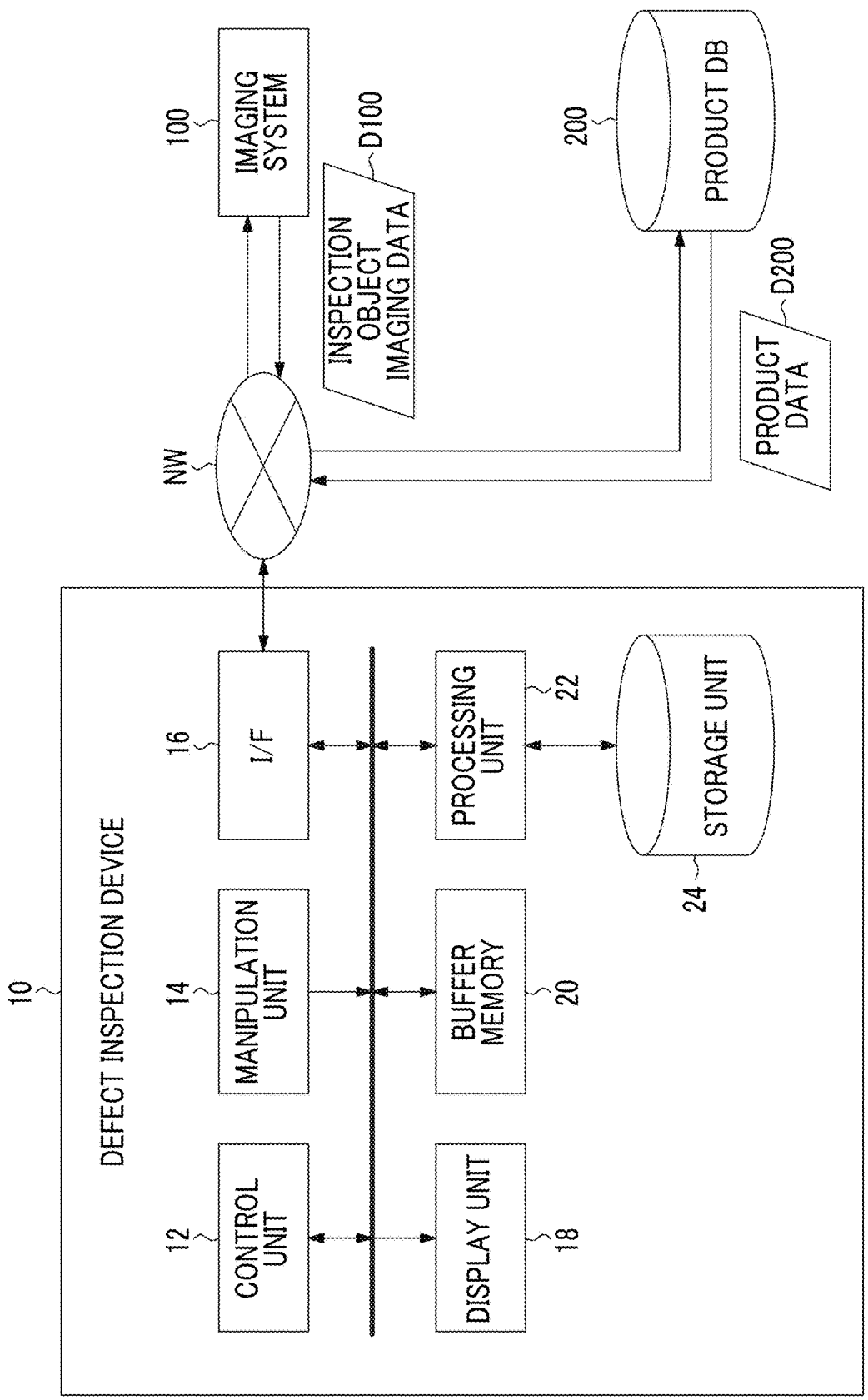
FIG. 1 is a block diagram illustrating a defect inspection device.

FIG. 1 is a block diagram illustrating a defect inspection device according to an embodiment of the present invention.

The defect inspection device 10 according to the embodiment is a device that detects a candidate of a defect (a defect candidate) from an image obtained by imaging an industrial product that is an inspection target (hereinafter referred to as an inspection object) and displays the defect candidate, and is a device for supporting diagnosis of the defect of the inspection object by an image interpreter. Here, the inspection object is a target of an inspection and various things are assumed. Particularly, an industrial product which is an industrial part requiring high precision design is assumed to be the inspection object, and the use of the defect inspection device 10 is assumed for industrial inspection. Further, the received light image is an image created on the basis of transmitted light or reflected light of the inspection object obtained by irradiating the inspection object with radiation.

As illustrated in FIG. 1, the defect inspection device 10 according to the first embodiment includes a control unit 12, a manipulation unit 14, an input and output interface (hereinafter referred to as an interface (I/F)) 16, a display unit 18, a buffer memory 20, a processing unit 22, and a storage unit 24.

The control unit 12 includes a central processing unit (CPU) that controls an operation of each unit of the defect inspection device 10. The control unit 12 functions as a display control unit, receives a manipulation input from an image interpreter via the manipulation unit 14, transmits a control signal corresponding to the manipulation input to each unit of the defect inspection device 10, and controls the operation of each unit. For example, the control unit 12 performs display control to display or not to display an auxiliary indication on the display unit 18 on the basis of a command output from the manipulation unit 14. Here, the auxiliary indication is a display indicating a position of the defect candidate image and the classification of the defect candidate image, and is displayed together with the defect candidate image on the display unit 18. The image interpreter can perform image interpretation more accurately and rapidly by performing image interpretation while viewing the auxiliary indication displayed on the display unit 18. That is, the image interpreter can accurately and rapidly discover the defect candidate image through the auxiliary indication, and can discriminate the classification of the defect candidate on the basis of the auxiliary indication.

The manipulation unit 14 is an input device that receives a manipulation input from the image interpreter and includes a keyboard for inputting characters, a pointing device (a mouse, a trackball, or the like) for manipulating a pointer, an icon, or the like displayed on the display unit 18. As the manipulation unit 14, a touch panel may be provided on a surface of the display unit 18 in place of or in addition to the means listed above. For example, the manipulation unit 14 receives selection of display or non-display of the auxiliary indication on the display unit 18, and outputs a command for the selected display or non-display of the auxiliary indication to the control unit 12. The display and non-display of the auxiliary indication on the display unit 18 are controlled so that the auxiliary indication is prevented from interfering with the image interpretation.

The I/F 16 is means for communicating with an external device via a network NW. Wired communication (for example, local area network (LAN), wide area network (WAN), or Internet connection) or wireless communication (for example, LAN, WAN, Internet connection) can be used as a method of transmitting and receiving data between the defect inspection device 10 and the external device. The I/F 16 functions as an image acquisition unit and acquires a received light image created on the basis of reflected light or transmitted light from the inspection object, which is obtained by irradiating the inspection object with light rays or radiation.

The defect inspection device 10 is able to receive an input of inspection object imaging data D100 including captured image data of the inspection object OBJ imaged by the imaging system 100 via the I/F 16. Here, the captured image data is image data constituting the received light image. Further, a method of inputting the inspection object imaging data D100 from the imaging system 100 to the defect inspection device 10 is not limited to communication via the network NW described above. For example, the defect inspection device 10 and the imaging system 100 may be connected by a universal serial bus (USB) cable, Bluetooth (registered trademark), infrared communication, or the like, and the inspection object imaging data D100 may be stored in a readable memory card that can be attached to or detached from the defect inspection device 10 and image data may be input to the defect inspection device 10 via this memory card.

Further, the defect inspection device 10 can communicate with a product database (product DB) 200 via the network NW. Product data D200 for each industrial product that can be an inspection target is stored in the product DB. The control unit 12 can search for inspection object specifying information for specifying the inspection object from the inspection object imaging data of the inspection object OBJ acquired from the imaging system 100, read out the inspection object specifying information, and acquire the product data D200 corresponding to the read inspection object specifying information from the product DB 200. By using this product data D200, it is possible to detect the defect candidate according to the type or feature of the inspection object OBJ.

As in the first embodiment, the product DB 200 may be installed on the network NW such that a manufacturer or the like can update the product data D200, or the product DB 200 may be provided in the defect inspection device 10.

The display unit 18 is a device for displaying an image. As the display unit 18, for example, a liquid crystal monitor (see FIG. 7) can be used. The display unit 18 displays the received light image, and the auxiliary indication which is displayed in association with the received light image. The control of the display of the display unit 18 is performed by the control unit 12.

The buffer memory 20 is used as a work area of the control unit 12 and an area for temporarily storing image data that is output to the display unit 18.

The storage unit 24 is means for storing data including a control program that is used by the control unit 12. As the storage unit 24, for example, a device including a magnetic disk such as a hard disk drive (HDD), a device including a flash memory such as an embedded multimedia card (eMMC) or a solid state drive (SSD), or the like can be used.

The inspection object imaging data D100 and the product data D200 are stored in the storage unit 24. Further, the storage unit 24 stores at least one of the defect image corresponding to the defect of the inspection object extracted in the past or the information indicating the feature of the defect image, and the classification information including the classification result indicating the classification of the defect of the defect image. That is, the storage unit 24 stores the defect image corresponding to the defect of the inspection object extracted in the past and/or the information indicating the feature of the defect image corresponding to the defect of the inspection object extracted in the past, and stores the classification result of the defect image in association with the defect image. The storage unit 24 stores a plurality of defect images and/or information indicating the feature of the plurality of defect images in advance before the inspection is performed, and the defect images or the information indicating the features of the defect images is stored in association with classification information indicating the classification result. Here, the defect image extracted in the past may be a defect image extracted in a case where inspection has been performed by the defect inspection device 10 in the past, or may be a defect image extracted by another inspection device in the past. Further, the information indicating the feature of the defect image is data indicating a feature portion in the image data of the defect image. The defect image and/or the information indicating the feature of the defect image recorded in the storage unit 24 and the classification information are used in a case where a classification is assigned to the defect candidate.

Further, the storage unit 24 can store a type of classification input via the manipulation unit 14. In this case, the manipulation unit 14 functions as an input unit that inputs a type of classification that is stored in the storage unit 24, and the storage unit 24 stores a classification result on the basis of a type input by the input unit. For example, the storage unit 24 may input a type of defect as described in "JIS Z 2300" for classification assignment, or may store a type of defect independently determined by a user in a case where the type of the defect has input via the manipulation unit 14. For example, the storage unit 24 may store a classification result of performing classification on the basis of a cause of generation of the defect. Here, examples of the cause of generation of the defect may include bubbles due to gas mixing, cracks of members, foreign matter adhesion, welding, or welding failure. A known aspect is adopted as a storage aspect of the defect image and/or the information indicating the feature of the defect image, and the classification result indicating the classification of the defect in the storage unit 24.

Further, information (data) stored in the storage unit 24 may be updated. For example, the information stored in the storage unit 24 may be updated by sequential storage of interpretation results of the image interpreter in the storage unit 24, in the defect inspection device 10.

The processing unit 22 extracts the defect candidate image, which is an image corresponding to the defect candidate of the inspection object, from the received light image through image processing. Further, the defect candidate classification unit 224 assigns a classification of the defect to the extracted defect candidate image on the basis of the classification information stored in the storage unit 24. The function of the processing unit 22 will be described below.

The processing unit 22 reads out the captured image data of the inspection object OBJ from the inspection object imaging data D100, and performs image processing on the captured image data to extract defect candidates. The processing unit 22 outputs the captured image data and the information on the defect candidate image indicating a detection result (a feature calculation result) of the detected defect candidate to the buffer memory 20. Further, the processing unit 22 also outputs the classification assigned to the defect candidate image to the buffer memory 20. Using the data output to the buffer memory 20, the control unit 12 creates a display image in which the auxiliary indication has been added to the defect candidate image of the received light image, and displays the display image on the display unit 18. Accordingly, the image interpreter can interpret the image displayed on the display unit 18 and perform inspection of the inspection object OBJ.

The image interpreter can input, for example, diagnosis results such as "The inspection object OBJ is immediately replaced with a new one", "Progress is observed (it is re-inspected after n days)", "Leaving it alone (it is not a defect)" for each of pieces of the information on the defect candidate image attached to the image displayed on the display unit 18 through the manipulation unit 14. The control unit 12 creates inspection object inspection result data D10 (see FIG. 5) including diagnosis result data and stores the inspection object inspection result data D10 in the storage unit 24. Accordingly, the information (data) stored in the storage unit 24 is updated.

Figure 2:
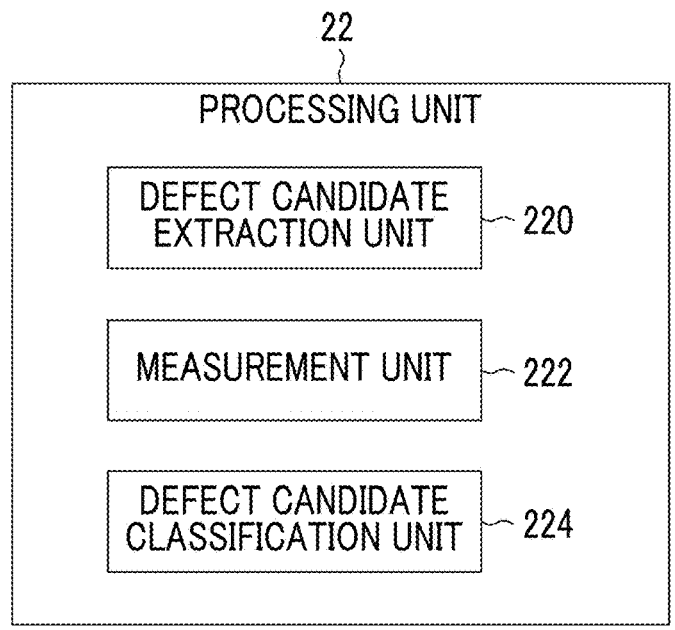
FIG. 2 is a block diagram illustrating an example of a function of a processing unit.

FIG. 2 is a block diagram illustrating an example of functions of the processing unit 22. As illustrated in FIG. 2, the processing unit 22 includes a defect candidate extraction unit 220, a measurement unit 222, and a defect candidate classification unit 224.

The defect candidate extraction unit 220 functions as an image processing unit. The defect candidate extraction unit 220 performs detection of candidates for defects (for example, scratches, cracks, abrasion, or rust) of the inspection object OBJ by performing image processing (for example, a color conversion process, a monochrome conversion process, an edge emphasis process, and a process for conversion to three-dimensional data) on the captured image data to detect a change in color, brightness value, or the like of the inspection object OBJ. The defect candidate extraction unit 220 performs detection of the defect on the basis of, for example, a change in color and an edge detection result. Accordingly, a position and a shape of the defect candidate are specified.

Incidentally, for example, product image data including an image of a product (a new product) from which the same defect of the inspection object OBJ has not been detected is included in the product data D200, and the product image data may be compared with the captured image data of the inspection object OBJ so that detection of defect candidates is performed.

The measurement unit 222 measures a dimension of each portion of the inspection object OBJ on the basis of the captured image data of the inspection object OBJ and imaging condition data. For example, the measurement unit 222 measures, for example, a size of the inspection object OBJ on the basis of the imaging condition data such as a distance between the camera and the inspection object OBJ at the time of imaging, a focal length, and a zoom magnification, and the size of the inspection object OBJ in the captured image data. Using the size of the inspection object OBJ, the size of the inspection object OBJ in the captured image data, and the size of the defect candidate that are measured, the measurement unit 222 calculates a size of the defect candidate (for example, a maximum size, a minimum size, a depth of a cracks, or an angle). The size of the inspection object OBJ may be acquired via the product data D200.

Further, the measurement unit 222 measures the wall thickness of each position of the inspection object OBJ using information indicating a dimension of each portion of the inspection object OBJ and, for example, a reflectance and a transmittance (transmission attenuation) of irradiation light at the time of imaging the inspection object OBJ. The wall thickness may be measured by the imaging system 100 at the time of imaging and included in the inspection object imaging data D100.

The defect candidate classification unit 224 assigns a classification of the defect to the extracted defect candidate images on the basis of the classification information stored in the storage unit 24. For example, the defect candidate classification unit 224 calculates a degree of similarity between the defect candidate images extracted by the processing unit 22 and at least one of the defect image corresponding to the defect of the inspection object extracted in the past or the information indicating the feature of the defect image, and assigns the defect classification to the defect candidate image on the basis of the degree of similarity. Here, the degree of similarity calculated by the defect candidate classification unit 224 is calculated using a known method. For example, the defect candidate classification unit 224 calculates the degree of similarity through block matching between the defect candidate image extracted by the processing unit 22 and the defect image extracted in the past. For example, the defect candidate classification unit 224 calculates the degree of similarity between the extracted defect candidate image and the defect image (information indicating the feature of the defect image) stored in the storage unit 24, and assigns a result of the classification attached to the defect image having the highest degree of similarity as the classification of the defect of the defect candidate image.

Figure 3:
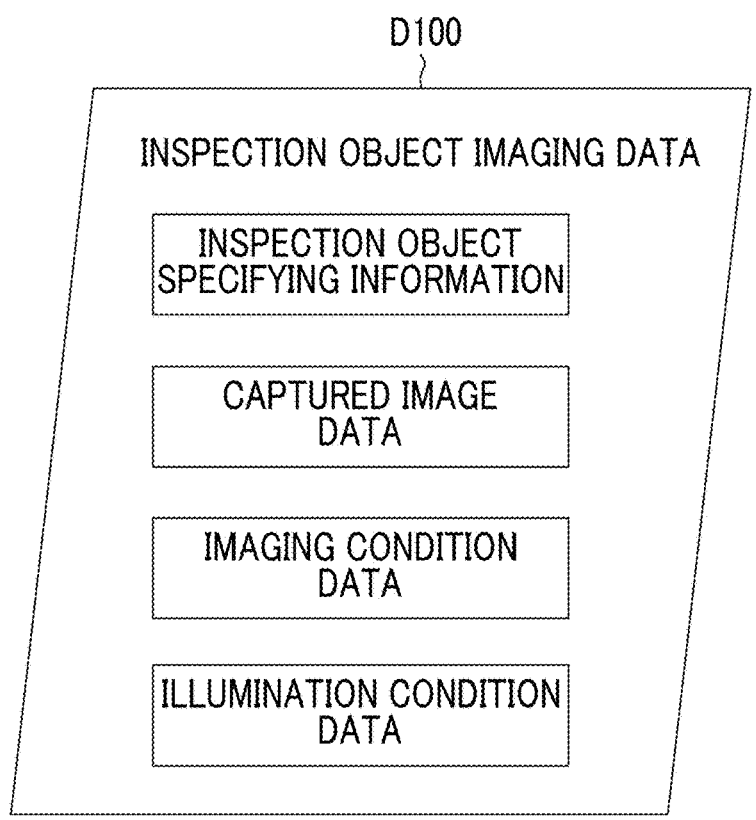
FIG. 3 is a block diagram illustrating an example of inspection object imaging data.

FIG. 3 is a block diagram illustrating an example of inspection object imaging data. As illustrated in FIG. 3, the inspection object imaging data D100 includes inspection object specifying information, captured image data, imaging condition data, and illumination condition data.

The inspection object specifying information is information for specifying the inspection object OBJ, and includes, for example, information indicating a product name, a product number, a manufacturer name, and a technical classification of the inspection object OBJ.

The captured image data is image data (for example, an X-ray image or a visible light image) obtained by imaging the inspection object OBJ.

The imaging condition data is stored for each captured image data of the inspection object OBJ, and includes information indicating an imaging date and time, an imaging target place of each captured image data, a distance between the inspection object OBJ and a camera at the time of imaging, and an angle with respect to the camera.

The illumination condition data includes information indicating a type (for example, X-rays, visible light rays, transmitted light rays, or reflected light rays), an irradiation intensity, and an irradiation angle of the radiation used for imaging of the inspection object OBJ.

FIG. 4 is a block diagram illustrating an example of product data. As illustrated in FIG. 4, product information includes product specifying information, product attribute information, and inspection area designation information. The product data D200 may be recorded in the storage unit 24 in association with the inspection object imaging data D100 and the inspection object inspection result data D10 via the inspection object specifying information and the product specifying information, or may be acquired from the product DB 200 each time the defect inspection is performed.

The product specifying information is information for specifying a product, and includes, for example, information indicating a product name, a product number, a manufacturer name, and a technical classification.

The product attribute information includes, for example, information indicating a material and size of each portion of the product, and a usage of the product. Information indicating the use of the product includes, for example, information on a name, a type, a processing state, and an attachment method (for example, a junction portion, a welded portion, screwing, fitting, or soldering) of a device or the like to which the product is attached. In addition, the product attribute information includes defect generation information. The defect generation information includes, for example, at least one information among a past inspection date and time, a material of the inspection object OBJ, a type of defect (for example, a foreign matter or a crack) generated in the past, a shape, a size, a depth, an generation site (site coordinates, a wall thickness of the material, a processing state (for example, a junction portion or a welded portion)), frequency information on a defect generation frequency, and a capture image of the defect.

The inspection area designation information includes information indicating an inspection area designated by a manufacturer or the like of each product (for example, which is information including a position of the inspection area, and is created on the basis of defect generation information such as presence or absence of a defect occurred in the past and frequency information on a frequency of defect generation). The inspection area designation information is created, for example, by specifying a place at which it is easy for a defect to occur statistically or structurally on the basis of information in a case where the manufacturer or the like has repaired the product in the past.

In a case where the defect candidate is detected from the inspection object OBJ, the processing unit 22 is able to increase detection accuracy of the defect candidate with respect to the inspection area designated by the inspection area designation information (for example, decrease a minimum size (a threshold value of the size) of scratches or the like and a threshold value of depth of a crack detected as the defect candidate). In addition, in a case where the image of the inspection object OBJ and the image of the defect candidate are displayed on the display unit 18, a process of assigning the captured image data of the inspection area, a mark for identifying the defect candidate detected from a detection target area, and the like, and emphasizing these may be performed.

In a case where a product has a plurality of uses, the inspection area designation information is created for each use of the product (for example, a type of device to which the product is attached, or an installation place), and a defect candidate may be detected using the inspection area designation information corresponding to the designated use.

In a case where there is no product data in which a product name or a product number matches, product data of a product having a similar technical classification may be acquired and used for image processing.

FIG. 5 is a block diagram illustrating an example of the inspection object inspection result data. As illustrated in FIG. 5, the inspection object inspection result data D10 includes inspection object measurement data, information on defect candidate images, and diagnosis result data, in addition to the inspection object specifying information. The inspection object inspection result data D10 is recorded in the storage unit 24 in association with the inspection object imaging data D100 via the inspection object specifying information.

The inspection object measurement data includes information indicating results of measuring a size of the inspection object OBJ and a wall thickness of the inspection object OBJ at each position in the measurement unit 222.

The information on the defect candidate includes information indicating the feature of the defect candidate (for example, a position, size, amount of change in wall thickness, or type of the defect candidate). The information indicating the position of the defect candidate can be expressed by coordinates on a coordinate system (for example, a three-dimensional orthogonal coordinate system, a polar coordinate system, or a cylindrical coordinate system) set according to a shape of the inspection object OBJ. The information indicating the type of the defect candidate is information assigned to the defect candidate classification unit 224 as described above and is, for example, information on a granular defect, a spot-like defect, a crack defect, or the like.

The diagnosis result data includes date and time of inspection, and information that the image interpreter has additionally input for the defect candidate. The diagnosis result data is, for example, "It is a defect. The classification is stain-like", "It is a defect. The classification is a foreign object shadow", or "It is not a defect". Further, the diagnosis result data may include information indicating the diagnosis result input by the image interpreter, such as "The inspection object OBJ is immediately replaced with a new one", "Progress is observed (it is re-inspected after n days)", "Leaving it alone (it is not a defect)".

It should be noted that the inspection object inspection result data D10 may include a part of inspection object imaging data D100 and product data D200.

Further, the inspection object inspection result data D10 may be transmitted to and accumulated in the product DB 200, and the inspection area designation information of the product data D200 may be updated using the information on the defect candidate and a result of analyzing the diagnosis result data included in the inspection object inspection result data D10.

[Configuration of Imaging System]

Figure 6:
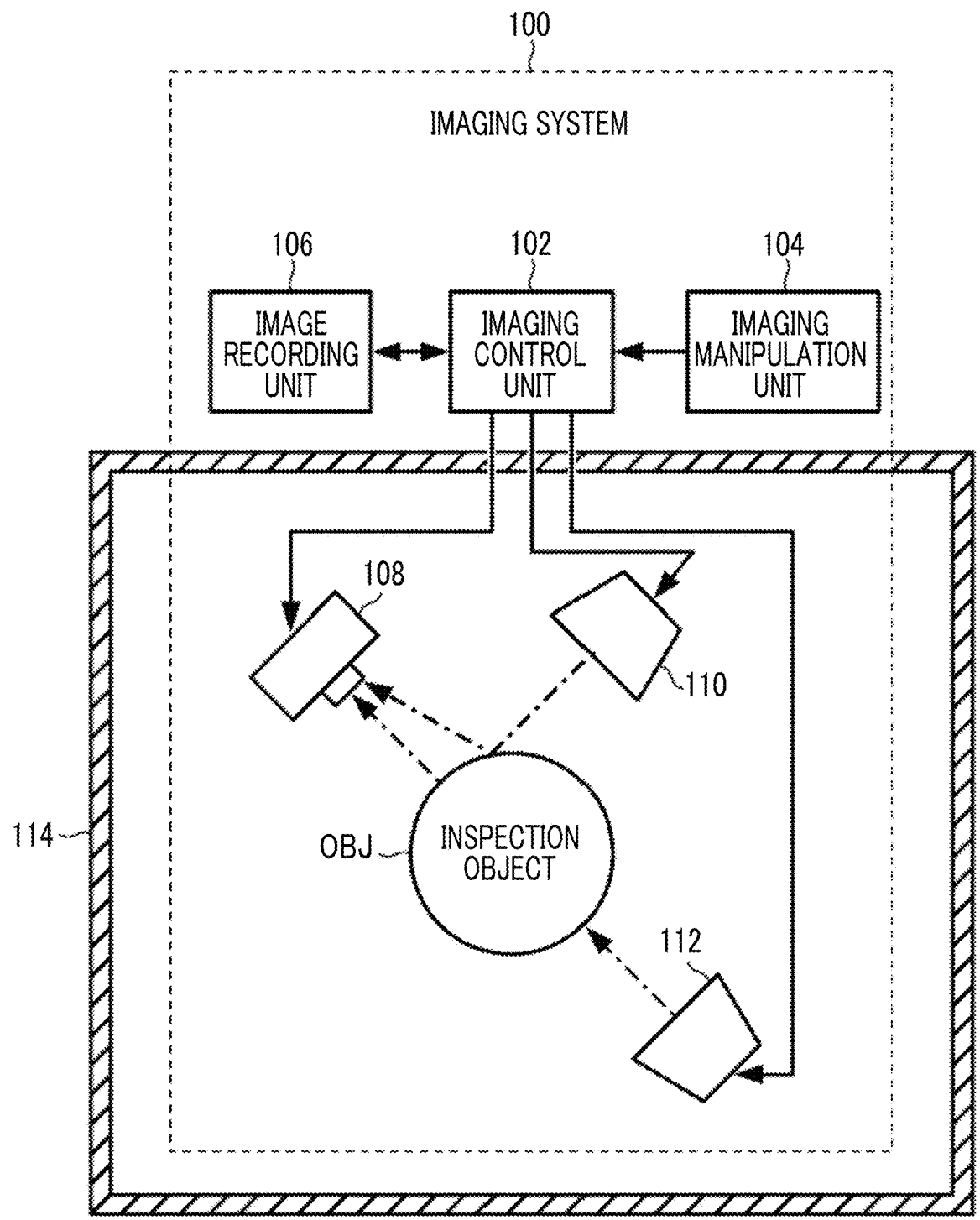
FIG. 6 is a block diagram illustrating an example of an imaging system.

Next, the imaging system 100 for capturing an image of an inspection object OBJ will be described. FIG. 6 is a block diagram illustrating an example of the imaging system 100.

As illustrated in FIG. 6, the imaging system 100 is for imaging the inspection object OBJ placed in an imaging room 114, and includes an imaging control unit 102, an imaging manipulation unit 104, an image recording unit 106, a camera 108, and radiation sources 110 and 112.

The imaging control unit 102 includes a central processing unit (CPU) that controls an operation of each unit of the imaging system 100. The imaging control unit 102 receives a manipulation input from an operator (a photographer) via the imaging manipulation unit 104, and transmits a control signal according to the manipulation input to each unit of the imaging system 100 to control an operation of each unit.

The imaging manipulation unit 104 is an input device that receives a manipulation input from an operator, and includes a keyboard for inputting characters, and a pointing device (a mouse, a trackball, or the like) for manipulating a pointer, an icon, or the like displayed on the display unit 18. Through the imaging manipulation unit 104, the operator can perform an input of information on the inspection object OBJ, an input of an instruction to instruct the camera 108 to execute imaging (including a setting of imaging conditions such as an exposure time, a focal length, and a stop, an imaging angle, an imaging place, or the like), an input of an instruction to instruct the radiation sources 110 and 112 to radiate radiation (including a setting of an irradiation start time, an irradiation duration time, an irradiation angle, an irradiation intensity, or the like), and an input of an instruction to record the acquired image data in the image recording unit 106.

The image recording unit 106 records the image data (received light image) of the inspection object OBJ captured by the camera 108. Information for specifying the inspection object OBJ is recorded in association with the image data in the image recording unit 106.

The camera 108 and the radiation sources 110 and 112 are disposed inside the imaging room 114. The radiation sources 110 and 112 are, for example, X-ray sources. X-ray protection is performed by an X-ray protection material (for example, lead or concrete) at a partition wall between the imaging room 114 and the outside and an entrance and an exit. In a case where imaging is performed through irradiation of the inspection object OBJ with visible light, it is not necessary for the protected imaging room 114 to be used.

The radiation sources 110 and 112 irradiate the inspection object OBJ placed in the imaging room 114 with radiation according to an instruction from the imaging control unit 102.

According to an imaging execution instruction from the imaging control unit 102, the camera 108 receives the radiation radiated from the radiation source 110 to the inspection object OBJ and reflected from the inspection object OBJ or the radiation radiated from the radiation source 112 to the inspection object OBJ and transmitted through the inspection object OBJ and images the inspection object OBJ. The inspection object OBJ is held in the imaging room 114 by a holding member (not shown) (for example, a manipulator, a placing stage, or a movable placing stage), and a distance and an angle of the inspection object OBJ with respect to the camera 108 and the radiation sources 110 and 112 can be adjusted. An operator can control relative positions of the inspection object OBJ, the camera 108, and the radiation sources 110 and 112 via the imaging control unit 102, and image a desired place of the inspection object OBJ.

The radiation sources 110 and 112 end the radiation of the radiation to the inspection object OBJ in synchronization with the end of the imaging of the camera 108.

Although the camera 108 is disposed inside the imaging room 114 in the example illustrated in FIG. 6, the camera 108 may be disposed in the outside as long as the camera 108 is able to image the inspection object OBJ in the imaging room 114.

Further, in the example illustrated in FIG. 6, one camera 108 and two radiation sources 110 and 112 are provided, but the number of cameras and radiation sources is not limited to thereto. For example, a plurality of cameras and a plurality of radiation sources may be provided or one camera and one radiation source may be provided.

Next, examples of display control of the received light image and the auxiliary indication will be described.

Figure 7:
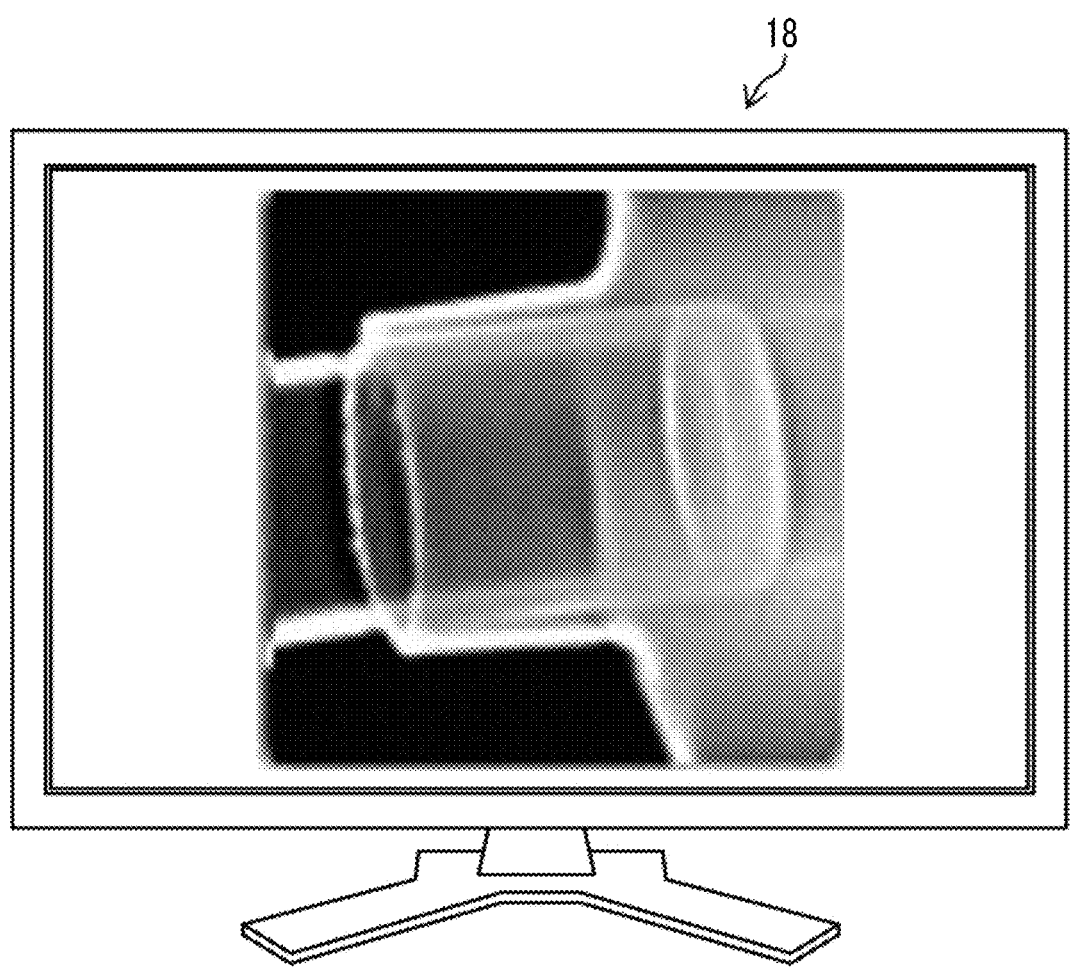
FIG. 7 is a front view illustrating an appearance of a display unit.

FIG. 7 is a front view illustrating an appearance of the display unit 18 of the defect inspection device 10 according to an embodiment of the present invention. As illustrated in FIG. 7, a liquid crystal monitor is an example of the display unit 18. Besides, a specific example of the display unit 18 may include a display screen of a smartphone or a display screen of a mobile terminal.

Figure 8:
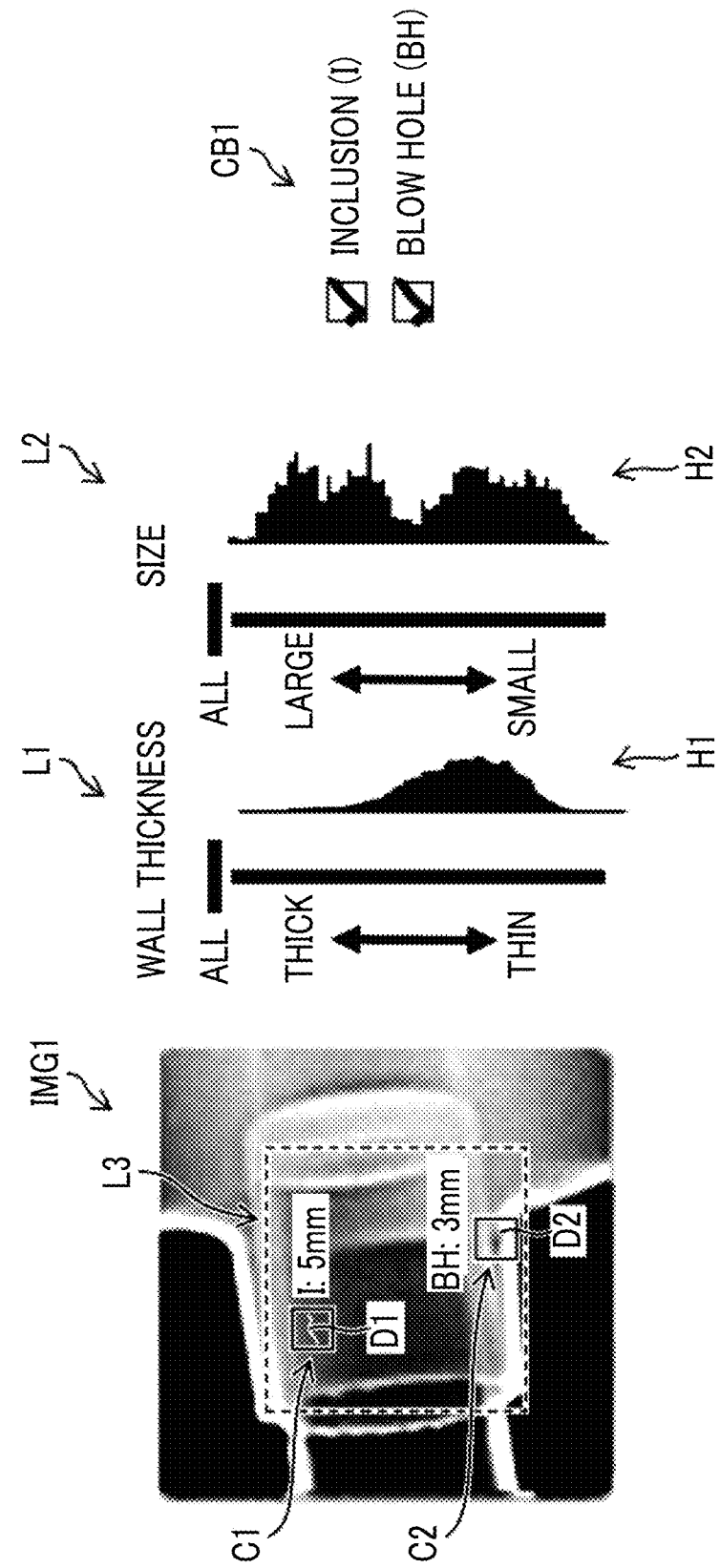
FIG. 8 is a diagram illustrating a display example of a received light image and an auxiliary indication that are displayed on a display unit.
Figure 9:
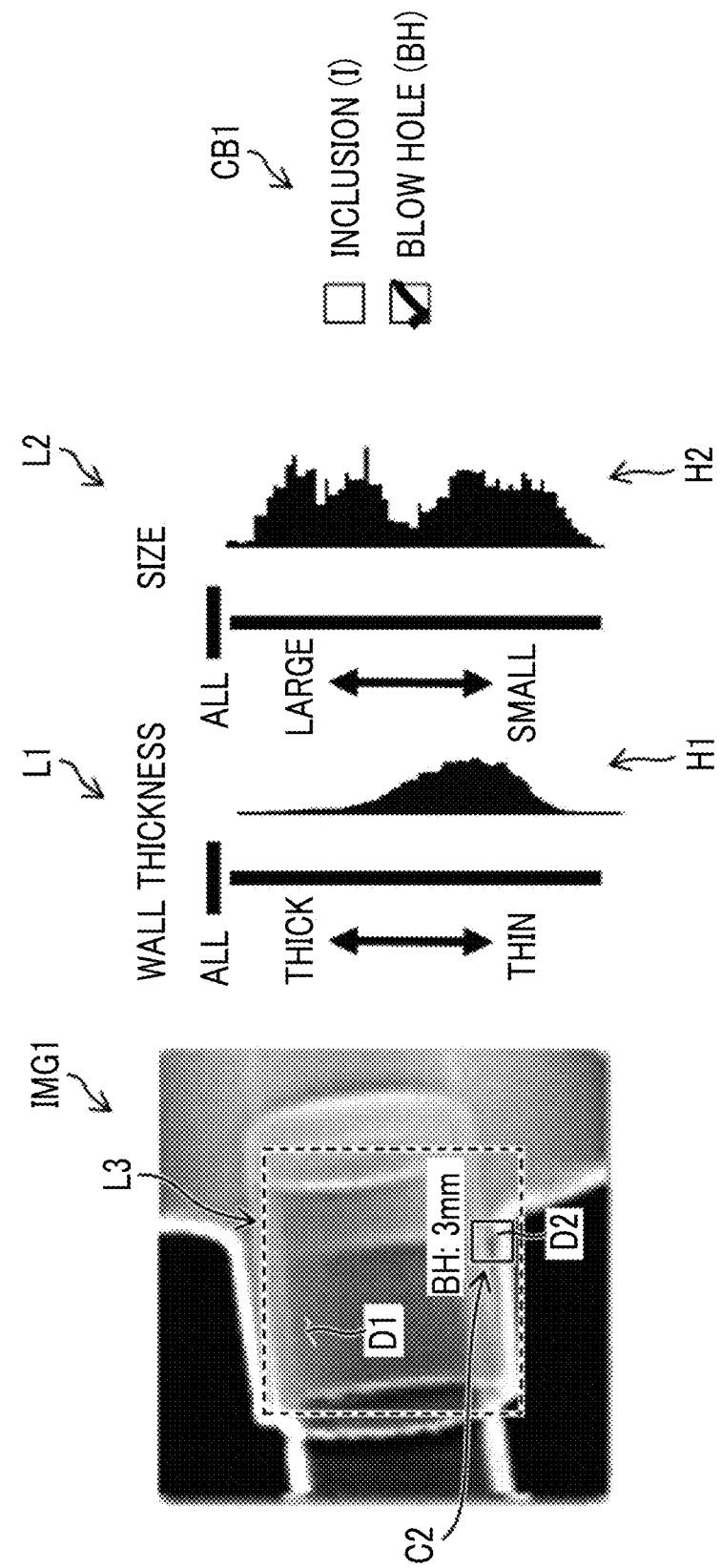
FIG. 9 is a diagram illustrating a display example of a received light image and an auxiliary indication that are displayed on a display unit.

FIGS. 8 and 9 are diagrams illustrating display examples of the received light image and the auxiliary indication that are displayed on the display unit 18 under the control of the control unit 12.

As illustrated in FIG. 8, a received light image IMG1 of the inspection object OBJ and a graphical user interface (GUI) for changing a display target are mainly displayed on the display unit 18.

The received light image IMG1 includes images (hereinafter referred to as defect candidate images D1 and D2) indicating defect candidates detected by the processing unit 22. In addition, auxiliary indications C1 and C2 indicating the position of the defect candidate image and the classification of the defect candidate image are displayed in a superimposed manner on the received light image IMG1.

Squares are adopted as figures indicating the positions of the defect candidate images in the auxiliary indication C1 and C2. That is, the squares included in the auxiliary indications C1 and C2 surround the periphery of the defect candidate images D1 and D2, and clearly indicate the positions of the defect candidate images D1 and D2 to the image interpreter. Also, the auxiliary indications C1 and C2 display information indicating the classification assigned as at least one of a symbol or a character. Specifically, in the auxiliary indication C1, "I" indicates the classification of the defect candidate image. Here, "I" indicates a classification of an inclusion defect. Further, in the auxiliary indication C2, "BH" indicates the classification of the defect candidate image. Here, "BH" indicates a classification of a defect of a blow hole. Further, the auxiliary indications C1 and C2 include information on a size of the defect candidate based on the extracted defect candidate images. Specifically, in the auxiliary indication C1, the size of the defect candidate image D1 is displayed as 5 mm and the size of the defect candidate image D2 is displayed as 3 mm. A method of measuring the size of the defect candidate in the defect candidate image will be described below. Further, in the auxiliary indications C1 and C2, color may be partially or entirely changed according to the classification assigned to the defect candidate image. For example, the auxiliary indication C1 may be displayed in red and the auxiliary indication C2 may be displayed in green.

A check box CB1 is a GUI for selecting a type of defect that is displayed on the received light image IMG1. In a case where "Inclusion (I)" or "Blow hole (BH)" of the check box CB1 is selected by the manipulation unit 14, the control unit 12 displays only the selected type of defect candidate image on the received light image IMG1. For example, in a case where "Inclusion (I)" is selected, only the defect candidate image D1 is displayed on the received light image IMG1, and the display of the defect candidate image D2 is erased. The image interpreter can manipulate the check box CB1 via the pointing device of the manipulation unit 14 to select the type of defect that is a display target from among "Inclusion (I)" and "Blow hole (BH)".

FIG. 9 is a diagram illustrating a case where "Blow hole (BH)" has been selected in the check box CB1. In the case illustrated in FIG. 9, since "Blow hole (BH)" is selected in the check box CB1, only the auxiliary indication C2 of the defect candidate image D2 classified as the blow hole is shown in the received light image IMG1, and the auxiliary indication C1 showing the classification of "Inclusion (I)" is not displayed.

Referring back to FIG. 8, in the auxiliary indication displayed on the display unit 18, a display or a non-display of the defect candidate image and/or selection of the display or the non-display of the auxiliary indication may be received through an input of the wall thickness of the inspection object, the area of the inspection object, or the size of the defect candidate in the manipulation unit 14.

Sliders (slider bars) L1 and L2 are GUIs for changing a wall thickness of the defect (or a wall thickness of the inspection object) displayed on the received light image IMG1 and a size of the defect continuously or in a stepwise manner, and is a manipulation unit 14 displayed on the display unit 18. Histograms H1 and H2 are displayed side by side on the sliders L1 and L2, respectively. The histograms H1 and H2 show a frequency distribution of detection frequencies of defect candidates for each wall thickness and size.

In the example illustrated in FIG. 8, both the wall thickness and the size are set so that "all" is displayed, and defect candidates at all places of the inspection object OBJ are displayed. In a case where the sliders L1 and L2 are manipulated (moved) by the manipulation unit 14, only the auxiliary indication and/or the defect candidate image in a range of the wall thickness selected by the slider L1 and a range of the size selected by the slider L2 is displayed, and the defect candidate images outside each range are erased. In FIG. 8, only the defect candidate images D1 and D2 and the auxiliary indications C1 and C2 are displayed, and other defect candidate images and auxiliary indications are omitted.

Further, in the embodiment, the wall thickness of the place at which the defect candidate has been detected and the size of the defect candidate are changed continuously or in stepwise manner using the GUI including the sliders L1 and L2 such that defect candidates or the auxiliary indications that are display targets can be selected, but the embodiment is not limited to thereto. For example, an input of a numerical value or a numerical value range indicating the wall thickness or the size (hereinafter referred to as a numerical value or the like) may be received via the manipulation unit 14, and only the defect candidate and/or the auxiliary indication included in the input numerical value or the like may be selectively displayed. In a case where an input of a numerical value range is received, an input of an upper limit value or a lower limit value may be received via the manipulation unit 14 and only a defect candidate and/or an auxiliary indication equal to or smaller than the input upper limit value or equal to or greater than the input lower limit value of the wall thickness or the size may be displayed.

Further, numerical values or numerical value ranges designated by the sliders L1 and L2 may be displayed together with the sliders L1 and L2 of the embodiment. In a case where the sliders L1 and L2 are displayed together with the numerical value or the like, the control unit 12 may update the numerical value or the like that is displayed according to the manipulation of the sliders L1 and L2, or may move the sliders L1 and L2 in conjunction with the numerical input from the manipulation unit 14. Further, a width of the sliders L1 and L2 in each slider bar, that is, a range of numerical values that can be designated by the sliders L1 and L2 may be able to be changed by a drag manipulation of the manipulation unit 14 or a numerical input from the manipulation unit 14. For example, in a case where the width of the slider L1 is designated to be 1 μm, only the defect candidate in a range of ±0.5 μm with reference to the position of the slider L1 may be displayed on the display unit 18. In a case where the width of the sliders L1 and L2 is changed by a drag manipulation, a numerical value indicating the width of the sliders L1 and L2 may be updated and displayed in conjunction with the drag manipulation.

In the case illustrated in FIG. 8, an input area L3 for performing a display of the auxiliary indication is shown. For example, in a case where the display unit 18 is configured as a touch panel, a user can specify the input area L3 by touching the touch panel and perform selection so that the auxiliary indication is displayed in the input area L3.

Figure 10:
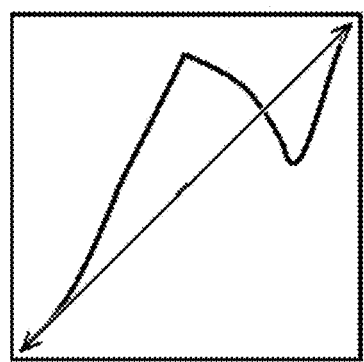
FIG. 10 is a diagram illustrating an example of a method of calculating a size of a defect.

Next, an example of size measurement of a defect that is performed by the measurement unit 222 will be described. FIG. 10 is a diagram illustrating an example of a method of calculating a size of a defect of a defect candidate image. As illustrated in FIG. 10, for example, a length of a diagonal line of a rectangle indicating a minimum area including the defect candidate image may be set as a size of the defect of the defect candidate image. The size of the defect of the defect candidate image may be calculated using another method.

Next, an example of a change in display in a case where the sliders L1 and L2 are moved will be described. FIGS. 11 to 14 are diagrams illustrating a change in display in a case where the slider is moved in a case where the received light image IMG2 is displayed on the display unit 18. In the example illustrated in FIG. 11, the sliders L1 and L2 are moved to positions at which the number of detected defect candidates is largest in the histograms H1 and H2. By moving the slider L1 to the position at which the number of detected defect candidates is the largest, it is possible to specify a place at which the number of detected defect candidates is large, that is, a place at which a generation frequency of the defect is considered to be high together with a wall thickness of a non-inspection object. Further, by moving the slider L2 to a position at which the number of detected defect candidates is the largest, the image interpreter can estimate a size of the defect having a high generation frequency.

Figure 11:
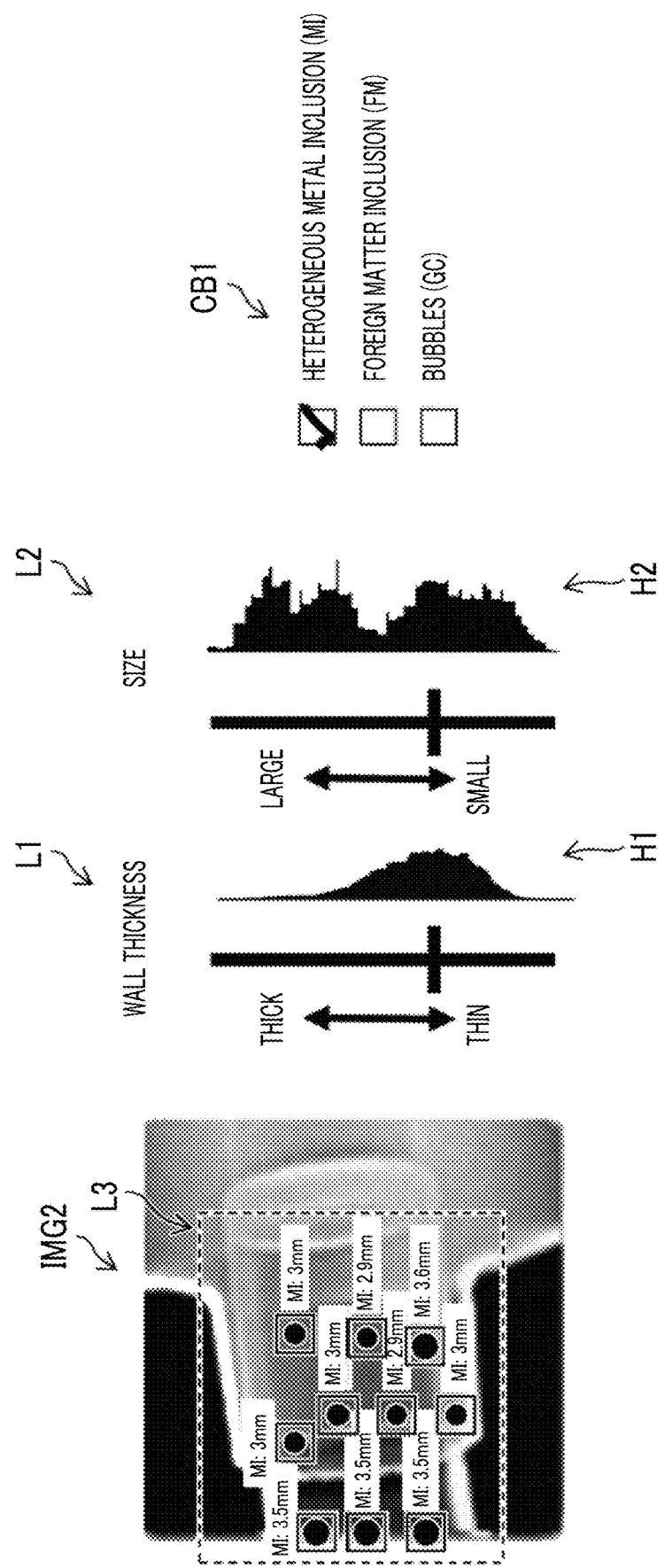
FIG. 11 is a diagram illustrating a change in display in a case where a slider displayed on a display unit is moved.

In FIG. 11, since heterogeneous metal inclusion is selected in the check box CB1, a defect candidate image having a size selected by the slider L2, which is located in a selected input area L3 of the received light image IMG2 and present in a wall thickness portion of the inspection object selected by the slider L1 is displayed. Each of displayed defect candidate images has an auxiliary indication, and a classification of the defect candidate of the defect candidate image in the auxiliary indication is indicated by an alphabet MI, a size is indicated by a numerical value, and a position of the defect candidate image is indicated by a quadrangular frame. A display or a non-display of the auxiliary indication shown in each defect candidate image can be controlled by a selection and manipulation of the image interpreter.

Figure 12:
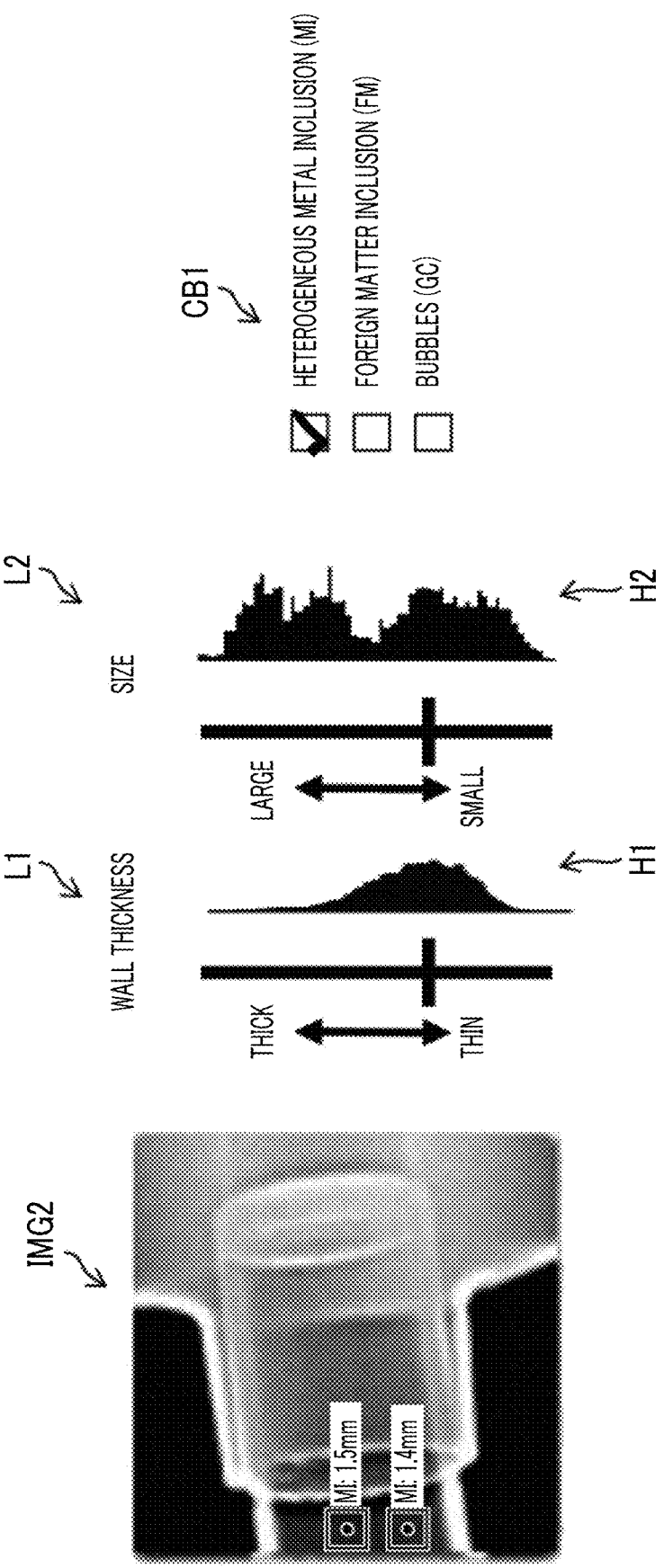
FIG. 12 is a diagram illustrating a change in display in a case where a slider displayed on a display unit is moved.

In an example illustrated in FIG. 12, a defect candidate image having a comparatively small size, which is a place at which a wall thickness is relatively small in the inspection object OBJ is set to be displayed by sliders L1 and L2 from the example illustrated in FIG. 11. A defect candidate having a size selected by the slider L2 is shown in a thick wall portion of the inspection object selected by the slider L1 on the display unit 18. Each shown defect candidate image has an auxiliary indication, and the position, classification, and size of the defect candidate are shown as described with reference to FIG. 11.

Figure 13:
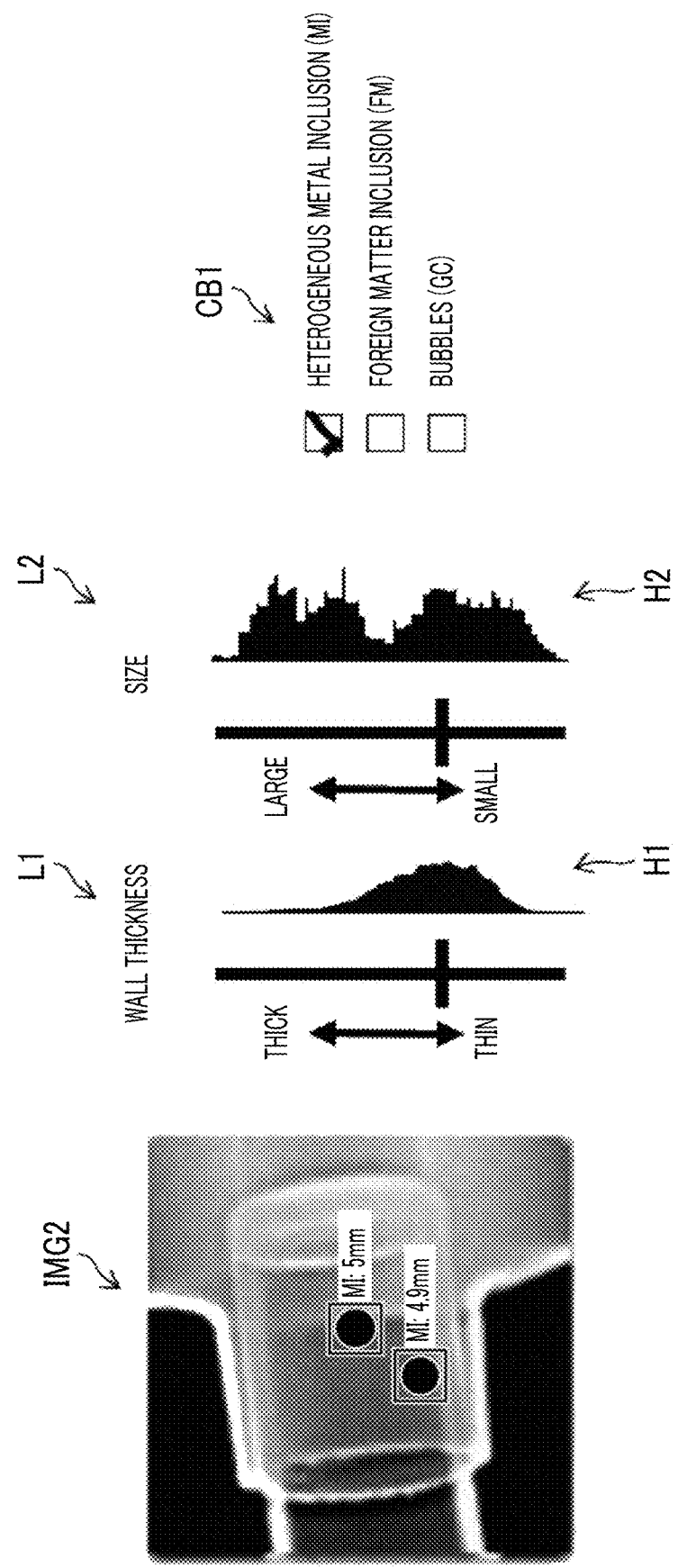
FIG. 13 is a diagram illustrating a change in display in a case where a slider displayed on a display unit is moved.

In an example illustrated in FIG. 13, a defect candidate image having a comparatively large size, which is a place at which a wall thickness is relatively great in the inspection object OBJ is set to be displayed by sliders L1 and L2 from the example illustrated in FIG. 11. A defect candidate having a size selected by the slider L2 is shown in a thick portion of the inspection object selected by the slider L1 on the display unit 18. Each shown defect candidate image has an auxiliary indication, and the position, classification, and size of the defect candidate are shown as described with reference to FIG. 11.

Figure 14:
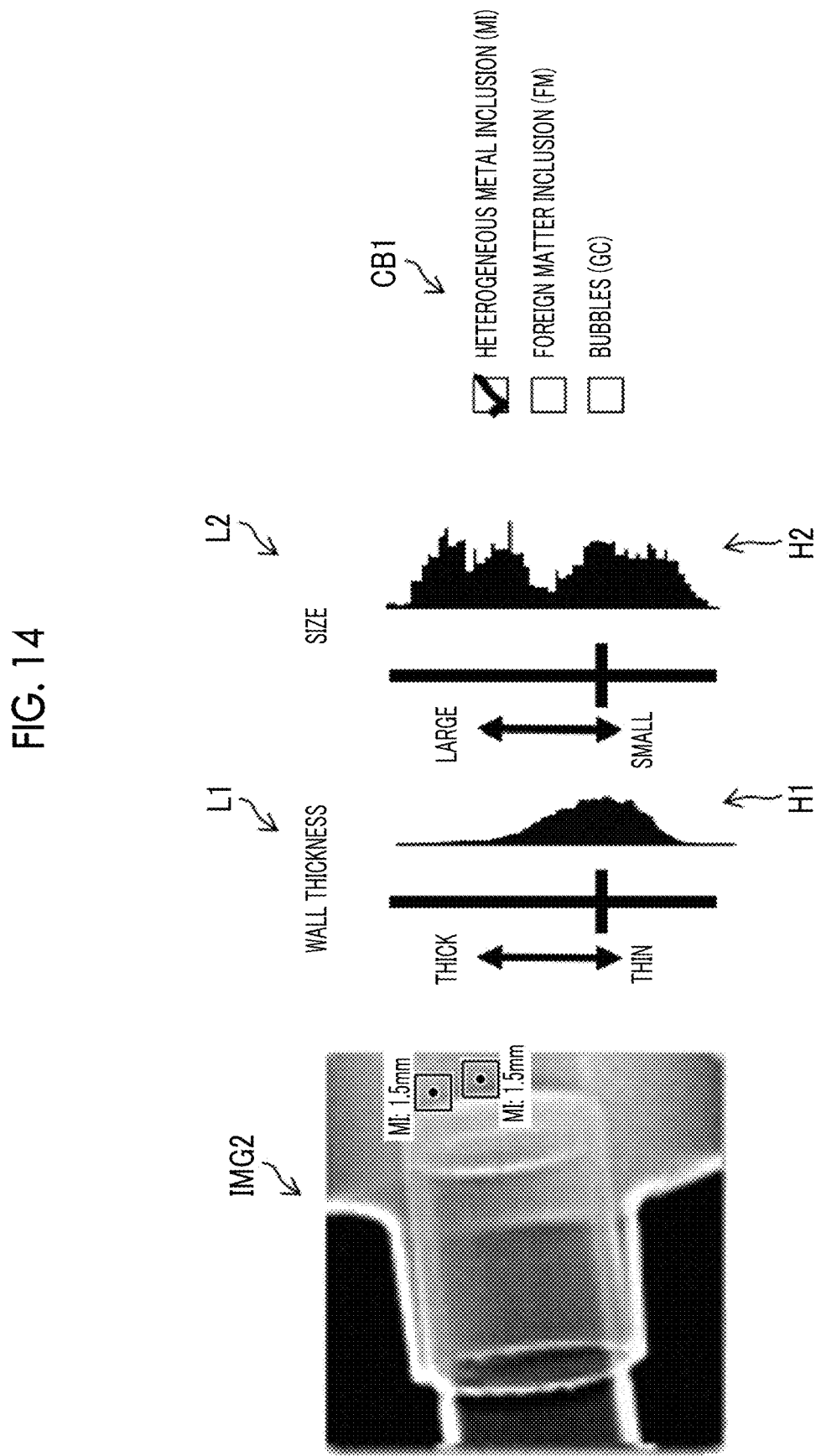
FIG. 14 is a diagram illustrating a change in display in a case where a slider displayed on a display unit is moved.

In an example illustrated in FIG. 14, a defect candidate image having a comparatively small size, which is a place at which a wall thickness is relatively great in the inspection object OBJ is set to be displayed by sliders L1 and L2 from the example illustrated in FIG. 11. A defect candidate having a size selected by the slider L2 is shown in a thick portion of the inspection object selected by the slider L1 on the display unit 18. Each shown defect candidate image has an auxiliary indication, and the position, classification, and size of the defect candidate are shown as described with reference to FIG. 11. In FIGS. 11 to 14, the aspect in which the display and the non-display of the defect candidate image and the auxiliary indication are simultaneously controlled has been described. However, the display and the non-display of the defect candidate image and the auxiliary indication may be performed independently. For example, the display control of only the auxiliary indication in a range designated by the sliders L1 and L2 may be performed.

Next, an operation of the defect inspection device 10 will be described.

Figure 15:
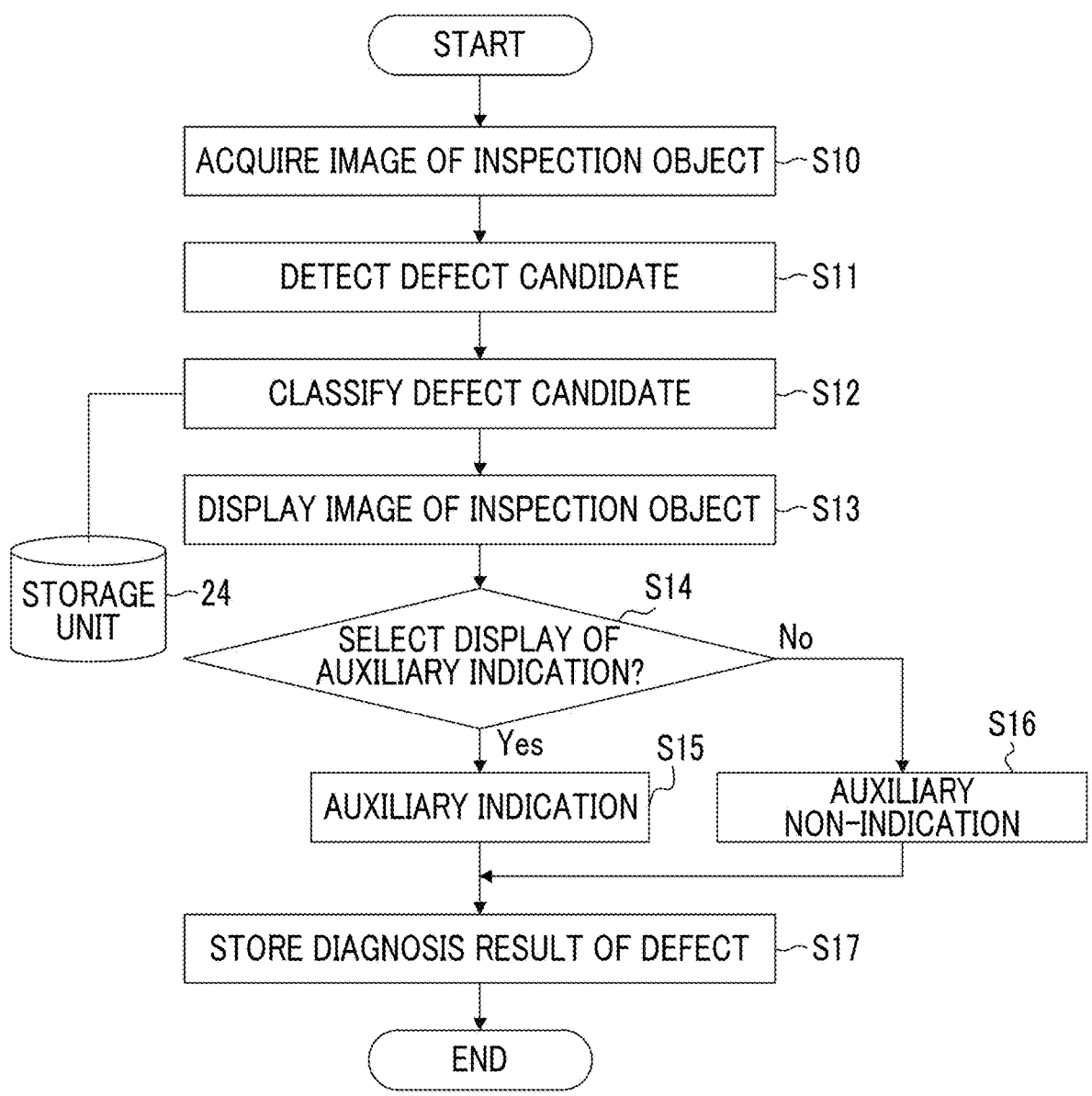
FIG. 15 is a diagram illustrating an operation flow of a defect inspection device.

FIG. 15 is a flowchart showing an example of the operation of the defect inspection device 10. First, the defect inspection device 10 acquires the inspection object imaging data D100 including the received light image (captured image data) from the imaging system 100 via the I/F 16 (step S10: image acquisition step). The processing unit 22 performs image processing on the received light image acquired in step S10 to detect a defect candidate (step S11: image processing step). The processing unit 22 compares the extracted defect candidate image with the defect image extracted in the past, which is stored in the storage unit 24, or information indicating a feature thereof and reads out the classification stored in association with a defect image having a highest degree of similarity or information indicating a feature thereof. The processing unit 22 assigns this classification as a classification of the defect candidate image (step S12: defect candidate classification step). Thereafter, the control unit 12 creates a display image on the basis of the received light image acquired in step S10, a result of the detection of the defect candidate in step S12, and a result of the classification, and outputs the display image to the display unit 18. Accordingly, the received light image IMG1 to which the defect candidate image and the auxiliary indication are attached are displayed on the display unit 18 (step S13: display step). At least one of the defect image corresponding to the defect of the inspection object extracted in the past or the information indicating the feature of the defect image, and the classification information including the classification result indicating the classification of the defect of the defect image are stored in the storage unit 24 in advance (storage step).

Next, the image interpreter performs selection of a display or a non-display of the auxiliary indication via the manipulation unit 14 (step S14: manipulation step). In a case where the display of the auxiliary indication is selected, the display control unit causes the display unit 18 to display the auxiliary indication (step S15: display control step). On the other hand, in a case where the non-display of the auxiliary indication is selected, the display control unit does not cause the display unit 18 to display the auxiliary indication (step S16: display control step). The image interpreter may select the display or the non-display of the auxiliary indication for each of the defect candidate images, or may select the display or the non-display collectively for the displayed defect candidate images. Thereafter, in a case where the inspection by the image interpreter is ended and an instruction to end the display is input by the manipulation unit 14, the defect diagnosis result is stored as diagnosis result data in the inspection object inspection result data D10 and recorded in the storage unit 24 (step S17).

Each configuration and function described above can be appropriately realized by any hardware, any software, or a combination of the hardware and the software. For example, the present invention can also be applied to a program causing a computer to execute the above-described processing steps (processing procedure), a computer-readable recording medium (non-transitory tangible medium) on which such a program is recorded, or a computer capable of installing such a program.

Although the examples of the present invention have been described above, it is obvious that the present invention is not limited to the above-described embodiments, and various modifications can be made without departing from the spirit of the present invention.

EXPLANATION OF REFERENCES 10 defect inspection device
12 control unit
14 manipulation unit
16 I/F
18 display unit
20 buffer memory
22 processing unit
24 storage unit
100 imaging system
102 imaging control unit
104 imaging manipulation unit
106 image recording unit
108 camera
110 radiation source
112 radiation source
114 imaging room
220 defect candidate extraction unit
222 measurement unit
224 defect candidate classification unit
Step S10 to Step S17 step of defect inspection method

What is claimed is:
1. A defect inspection device comprising:
at least one processor configured to operate as:
an image acquisition unit that acquires a received light image created on the basis of transmitted light from an inspection object which is obtained by irradiating the inspection object with radiation;
an image processing unit that extracts a defect candidate image that is an image corresponding to a defect candidate of the inspection object from the received light image through image processing;
a storage unit, including a memory, that stores at least one of a defect image corresponding to a defect of the inspection object extracted in the past or information indicating a feature of the defect image, and classification information including a classification result indicating a classification of the defect of the defect image;

a defect candidate classification unit that assigns a defect classification to the extracted defect candidate image on the basis of the classification information stored in the storage unit;

a display unit that displays the received light image;

a manipulation unit that receives selection of a display or a non-display of an auxiliary indication indicating a position of the defect candidate image and the classification of the defect candidate image on the display unit based on a wall thickness of the inspection object where the defect candidate exists, a size of the defect candidate or the classification of the defect candidate, and outputs a command for the selected display or non-display of the auxiliary indication; and a display control unit that performs a display or a non-display of the auxiliary indication on the display unit on the basis of the command output from the manipulation unit.

2. The defect inspection device according to claim 1, wherein the manipulation unit receives the selection of the display or the non-display of the auxiliary indication based on the wall thickness of the inspection object where the defect candidate exists, the size of the defect candidate, and the classification of the defect candidate, and outputs the command for the selected display or non-display of the auxiliary indication.

3. The defect inspection device according to claim 1, wherein the manipulation unit receives the selection of the display or the non-display of the auxiliary indication based on the wall thickness of the inspection object where the defect candidate exists, a selection of the size of the defect candidate by a slider which is displayed on the display unit or a selection of the classification of the defect candidate by a check box which is displayed on the display unit, and outputs the command for the selected display or non-display of the auxiliary indication.

4. The defect inspection device according to claim 3, wherein the display control unit causes the display unit to display the auxiliary indication having the figure surrounding the periphery of the defect candidate image in the received light image.

5. The defect inspection device according to claim 1, wherein the display control unit causes the display unit to display the auxiliary indication indicating the assigned classification with at least one of a symbol or a character.

6. The defect inspection device according to claim 1, wherein the display control unit causes the display unit to display the auxiliary indication of which color has partially or entirely been changed according to the assigned classification.

7. The defect inspection device according to claim 1, wherein the display control unit causes the display unit to display the auxiliary indication including information on a size of the defect candidate based on the extracted defect candidate image.

8. The defect inspection device according to claim 1, further comprising:

an input unit that receives an input of a type of classification stored in the storage unit, wherein the storage unit stores the classification result on the basis of the type input by the input unit.

9. The defect inspection device according to claim 1, wherein the defect candidate classification unit calculates a degree of similarity between the extracted defect candidate image and at least one of the defect image or information indicating a feature of the defect image stored in the storage unit, and assigns a classification of the extracted defect candidate image on the basis of the classification result of the defect image having the highest calculated degree of similarity.

10. A defect inspection method comprising:

an image acquisition step of acquiring a received light image created on the basis of transmitted light from an inspection object which is obtained by irradiating the inspection object with radiation;

an image processing step of extracting a defect candidate image that is an image corresponding to a defect candidate of the inspection object from the received light image through image processing;

a storage step of storing at least one of a defect image corresponding to a defect of the inspection object extracted in the past or information indicating a feature of the defect image, and classification information including a classification result indicating a classification of the defect of the defect image in a storage unit;

a defect candidate classification step of assigning a defect classification to the extracted defect candidate image on the basis of the classification information stored in the storage unit;

a display step of displaying the received light image on a display unit;

a manipulation step of receiving selection of a display or a non-display of an auxiliary indication indicating a position of the defect candidate image and the classification of the defect candidate image on the display unit based on a wall thickness of the inspection object where the defect candidate exists, a size of the defect candidate or the classification of the defect candidate, and outputting a command for the selected display or non-display of the auxiliary indication; and a display control step of performing a display or a non-display of the auxiliary indication on the display unit on the basis of the command output from the manipulation step.

11. A computer-readable non-transitory tangible recording medium which records a defect inspection program causing a computer to execute:

an image acquisition step of acquiring a received light image created on the basis of transmitted light from an inspection object which is obtained by irradiating the inspection object with radiation;

an image processing step of extracting a defect candidate image that is an image corresponding to a defect candidate of the inspection object from the received light image through image processing;

a storage step of storing at least one of a defect image corresponding to a defect of the inspection object extracted in the past or information indicating a feature of the defect image, and classification information including a classification result indicating a classification of the defect of the defect image in a storage unit;

a defect candidate classification step of assigning a defect classification to the extracted defect candidate image on the basis of the classification information stored in the storage unit;

a display step of displaying the received light image on a display unit;

a manipulation step of receiving selection of a display or a non-display of an auxiliary indication indicating a position of the defect candidate image and the classification of the defect candidate image on the display unit based on a wall thickness of the inspection object where the defect candidate exists, a size of the defect candidate or the classification of the defect candidate, and outputting a command for the selected display or non-display of the auxiliary indication; and a display control step of performing a display or a non-display of the auxiliary indication on the display unit on the basis of the command output from the manipulation step.

\* \* \* \* \*